United States Patent [19]
Metz et al.

[11] 4,456,478
[45] Jun. 26, 1984

[54] METHOD OF AND APPARATUS FOR METALLURGICALLY TREATING MOLTEN METALS

[75] Inventors: Paul Metz; Corneille Melan, both of Luxembourg, Luxembourg

[73] Assignee: Arbed S.A., Luxembourg, Luxembourg

[21] Appl. No.: 491,036

[22] Filed: May 3, 1983

[30] Foreign Application Priority Data

May 7, 1982 [LU] Luxembourg ................. 84133

[51] Int. Cl.$^3$ ............................................. C21C 7/00
[52] U.S. Cl. ............................................. 75/53; 75/49; 266/207
[58] Field of Search ............................. 75/49, 53, 46; 266/207–212

[56] References Cited

U.S. PATENT DOCUMENTS 3,689,046 9/1972 DeBie ........................... 266/210
3,798,025 3/1974 Ramachandran ............... 75/49

Primary Examiner—Peter D. Rosenberg
Attorney, Agent, or Firm—Karl F. Ross; Herbert Dubno

[57] ABSTRACT

Molten steel, carried in a transport ladle from a converter to a casting stage, is treated in a heating chamber which has two tubes depending from its bottom into the ladle to a depth sufficient to penetrate a slag layer and an intermediate layer atop the melt. The ladle is surrounded by a pressure vessel whose rim sealingly engages an outlying annular flange of the chamber bottom and into which high-pressure gas is admitted to drive part of the melt into the heating chamber. Each of these two tubes is initially closed at its lower end by a fusible sheet-metal cap which prevents the entry of slag into the heating chamber but melts upon immersion into the hot metal bath. Treatment gas may be introduced into the chamber via one of these tubes.

3 Claims, 1 Drawing Figure

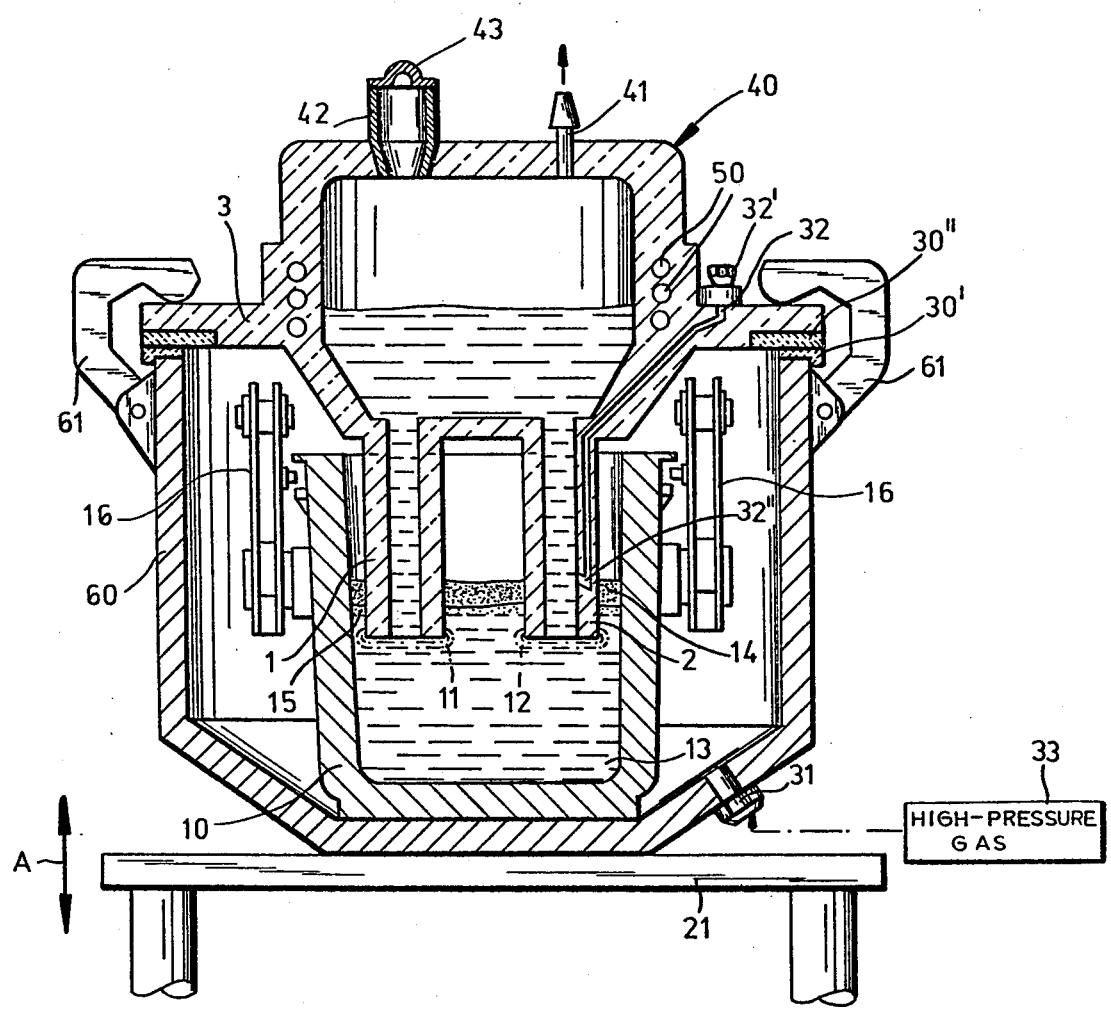

METHOD OF AND APPARATUS FOR METALLURGICALLY TREATING MOLTEN METALS

CROSS-REFERENCE TO RELATED APPLICATION

This application contains subject matter disclosed in formerly copending and now abandoned application Ser. No. 485,899 filed Apr. 18, 1983 by one of us, Paul Metz, and owned by the assignee of the present application.

Field of the Invention

Our present invention relates to a method of and an apparatus for the metallurgical treatment of steel or other metals supplied in molten form by a converter, refiner or similar source prior to being shaped into a solid workpiece, as by a continuous casting process.

Background of the Invention

A steel melt discharged from a converter is generally delivered to a casting stage in a transport vessel or ladle, usually guided on rails, at a temperature ranging between about 1,550° and 1,750° C. Such an elevated temperature is, of course, necessary in order to keep the metal sufficiently fluid when it reaches a distributor leading to the casting molds. With alloyed steels, in particular, the casting temperature should be near the upper limit of that range.

When the molten metal is to be subjected to further treatment by a gas flow and/or the admixture of solids, e.g. carburization, desulfurization or alloying, a temperature reduction unavoidably occurs. If, however, the converter must operate at a temperature high enough to take these losses into account, e.g. around 1,700° C., its refractory lining will have to be reinforced and will still be subjected to a rather rapid wear.

It is known to avoid the need for operating a converter at excessive temperatures by reheating the melt in the transport ladle, usually with the aid of an arc discharge. This method has the drawback of causing a significant and uncontrollable nitrogen absorption in the melt. The avoidance of such absorption requires the use of a hood fitting closely onto the ladle and sealing it against the atmosphere, thus enabling the operation to be performed under vacuum or in an otherwise nitrogen-free atmosphere. A further problem with such a procedure is the need for the absence of a slag layer which in turn necessitates cumbersome decanting or other slag-removing operations.

Another known method of raising the temperature of the melt in the transport ladle involves heating by means of induction coils disposed on the bottom or in the peripheral wall of the ladle. According to a specific proposal of the prior art, the ladle bottom is provided with a so-called channel inductor comprising a roughly semicircular pipe which is fitted with the field-generating coils and communicates with two apertures at that bottom. A flow of molten metal circulating through this pipe is inductively heated by the field so generated, causing the entire pool contained in the ladle to be gradually brought to the requisite higher temperature. A problem encountered with this arrangement resides in the thermal sensitivity of the channel inductor proper which, together with the ladle itself, must have a refractory lining subject to frequent replacement.

With a view to providing a relatively simple apparatus for subjecting freshly drawn molten metal, preparatorily to casting, to an intermediate treatment including heating to a higher temperature level as well as chemical and thermal homogenization of the melt which may be admixed with other substances during such treatment, the above-identified formerly copending application discloses a substantially closed treatment chamber whose generally horizontal bottom has one or more tubes depending therefrom for penetrating a slag layer that covers a pool of molten metal in an upwardly open transport ladle. This tubulation dips into the pool when the open top of the transport ladle is closely juxtaposed with the underside of the chamber bottom whereupon a differential gas pressure, generated across that bottom by pneumatic means, temporarily drives a portion of the molten metal through the tubulation into the treatment chamber which is provided with heating and agitating means for setting this portion into motion and raising its temperature.

As further described in that formerly copending application, and as known per se, the heating and agitating means comprise an induction coil disposed in a peripheral chamber wall. Reference in this connection may be made to a book titled "The Making, Shaping and Treating of Steel", Ninth Edition, edited by Harold E. McGannon and puhlished 1971 by United States Steel Corporation.

In order to generate the aforementioned pressure differential, the pneumatic means described in that application includes a conduit within the chamber bottom terminating at an outlet through which gas under pressure is introduced into the open-topped vessel, this outlet lying within a sealing ring provided at the underside of the chamber bottom. An exhaust port on the chamber cover is connectable to the low-pressure side of a blower for creating a partial vacuum within the chamber.

In order to prevent slag floating on the melt from entering the treatment chamber through its bottom tube or tubes during introduction of the latter into the ladle, and as further described in the copending application, each tube may be provided with temporary closure means such as a sheet-metal cap which is fusible in the molten metal when the assembly has been completed, as by a raising of the ladle into an elevated position in which its rim rests against the sealing ring of the treatment chamber. That chamber can also be provided with various inlets for the introduction of a treatment gas and/or of solid admixtures during heating and agitation.

Objects of the Invention

An object of our present invention is to provide a method of making the treatment of metals in conformity with the above-discussed procedure more generally applicable to transport ladles of widely varying types not specifically designed to interfit with a given treatment chamber.

A related object is to provide a relatively simple modification of the apparatus of the copending application for achieving this purpose.

Summary of the Invention

In accordance with our present invention, the transport ladle carrying the melt to be treated—overlain by a slag layer and a somewhat indistinct intermediate layer or phase—is placed in a larger pressure vessel so as to be spacedly surrounded thereby; a rim of that vessel leaves the top of the ladle uncovered to facilitate the insertion of the tubulation depending from the bottom of the treatment chamber into the interior of the vessel with penetration of the slag and intermediate layers floating on the metallic pool. The pressure vessel, which can be used with all sorts of transport ladles up to a certain height and width, is then sealingly fitted by its rim to the underside of a peripheral flange of the treatment chamber whereupon gas under pressure is introduced into the vessel from which it passes through the open top of the ladle into the interior of the latter to drive part of the molten metal from the pool into the chamber. The metal present in that chamber is then heated to the requisite temperature and possibly subjected to additional treatment, e.g. agitation by fluidic and/or electromagnetic forces.

In structural terms, therefore, our invention resides essentially in the provision of a pressure vessel with a rim which can be sealingly secured to the underside of a peripheral flange of the treatment chamber, with the aid of suitable fastening means such as a plurality of clamps engageable with that flange. The vessel communicates with a source of high-pressure gas for driving part of the contents of a ladle received therein into the treatment chamber through tube means depending from that chamber, preferably a pair of parallel tubes.

BRIEF DESCRIPTION OF THE DRAWING

The above and other features of our invention will now be described in detail with reference to the accompanying drawing the sole FIGURE of which shows, in a sectional elevational view, an apparatus representing a preferred embodiment.

SPECIFIC DESCRIPTION

The drawing shows an open-topped transport ladle 10 in which a steel melt 13 is being delivered from a nonillustrated converter to a casting stage also not shown. The melt 13 is covered by a slag layer 14 which floats, along with an intermediate layer 15, on a pool of metal constituting the major part of the melt. Lateral handles 16 enable the ladle 10 to be picked up by a crane which deposits it within a larger pressure vessel 60 surrounding the ladle with clearance and without obstructing its open top. Vessel 60 is mounted on a platform 21 which in turn may be supported by a railborne carriage and which can be elevated, as indicated by an arrow A, toward a stationary treatment chamber 40 having a body whose bottom is integral with two parallel and coextensive tubes 1 and 2 depending therefrom. Chamber 40 is held in position by suitable means not shown; alternatively, the chamber may be lowerable onto vessel 60. The rim of that vessel carries a sealing ring 30' which, in the illustrated position of engagement, is pressed against a similar sealing ring 3" provided on the underside of a peripheral flange 3 of chamber 40. The peripheral wall of this chamber contains an inductive heating coil 50 which may be cooled by the circulation of water through its interior as illustrated in the copending application referred to. It will also be understood that the structure of chamber 40, shown here somewhat diagrammatically as an integral body of refractory material, may be similar to that shown in the copending application, i.e. with a double-walled peripheral jacket overlain by a detachable cover and with a removable refractory liner integral with tubes 1 and 2.

Vessel 60 is provided with clamps 61 that engage the flange 3 to hold the two sealing rings 30' and 30" in firm contact with each other. In this clamped position tubes 1 and 2 project through layers 14 and 15 into the pool of metal 13 contained in ladle 10.

An inlet 31 enables gas under pressure, e.g. nitrogen or argon, to be introduced from a source 33 into vessel 60 whose interior freely communicates with the inside of ladle 10 whereby the gas acts upon the slag layer 14 to drive some of the metal into the chamber 40 for further treatment. A conduit 32 extends from an inlet 32' at the top of flange 3 to an outlet 32" near the bottom of tube 2 to enable the injection of a treatment gas via this tube into chamber 40. The cover of that chamber is further provided with an exhaust port 41, connectable to a nonillustrated vacuum pump, and with a hopper 42 which is closable by a lid 43 and enables the introduction of fragmented solids into the chamber.

The positioning of sealing rings 30' and 30" at a distance from the ladle does not expose them to the high temperature prevailing at the ladle entrance and obviates the need for separate venting channels around that entrance. The rim of the ladle, which does not come into contact with the chamber bottom, need not be meticulously cleaned after the melt has been filled in. Since the peripheral ladle wall is subjected to the same gas pressure from the inside and the outside, it does not have to be particularly strengthened against such pressure.

The pressure difference created across the chamber by the driving gas, possibly supplemented by vacuum, is limited to prevent the metal level in ladle 10 from dropping below the lower ends of the tubes. The admission of treatment gas via conduit 32 also causes an upward circulation of the melt in tube 2 and a downward return thereof to the ladle via tube 1 in accordance with the known R-H (Ruhrstahl-Heraeus) process; see, for example, FIG. 19—19 on page 598 of the aforecited book.

With coil 50 suitably energized, the metal in chamber 40 is heated as well as stirred in a manner known per se; see, for example, FIGS. 19-17 on page 597 of the aforementioned book. Thus, the melt circulating through tubes 1 and 2 between ladle 10 and chamber 40 is uniformly heated as well as alloyed, carburized, desulfurized (as by the entrainment of calcium with the gas stream of duct 32) and/or otherwise treated. Reference may also be made to another commonly owned copending application, Ser. No. 360,815, filed Mar. 22, 1982 and now U.S. Pat. No. 4,421,555 in which a variety of such metallurgical treatments are discussed.

The two tubes 1, 2 seen in the drawing may be replaced by a single tube, as likewise shown in the copending application first referred to, though this is less desirable. As indicated in phantom lines, and as also disclosed in that copending application, each tube is initially provided with a fusible sheet-metal cap 11, 12 temporarily closing its bottom as it passes through layers 14, 15 when the ladle 10 is being elevated, along with vessel 60, into the working position shown in the drawing. With caps 11 and 12 dissolved in the melt at the high temperature thereof, the interior of chamber 40 becomes accessible to the metal by way of tubes 1 and 2.

We claim:
1. A method of treating molten metal forming a pool covered by a slag layer and an adjoining intermediate layer in an upwardly open transport ladle, comprising the steps of:

(a) spacedly surrounding said ladle with a larger, upwardly open pressure vessel having a rim which leaves the top of said ladle uncovered;
(b) positioning said vessel, with said ladle contained therein, underneath a body which forms a substantially closed treatment chamber and has a tubulation depending from a bottom thereof and communicating with said chamber;
(c) inserting said tubulation from above through said rim into said ladle via the open top thereof to a level below said slag and intermediate layers;
(d) sealingly fitting the rim of said vessel to the underside of a peripheral flange of said body;
(e) introducing a gas under pressure into said vessel and thence through said open top into the interior of said ladle for driving part of the molten metal from said pool into said chamber; and
(f) heating the metal present in said chamber.

2. A method as defined in claim 1 wherein a lower end of said tubulation is initially sealed, prior to step (c), with a fusible cap for preventing entry of slag into said chamber, said cap melting in said pool upon insertion of said tubulation into said transport ladle.

3. A method as defined in claim 2, comprising the further step of feeding solid reactants into said chamber for treating the metal present therein.

* * * * *